(12) United States Patent
Asthana et al.

(10) Patent No.: US 8,889,820 B2
(45) Date of Patent: *Nov. 18, 2014

(54) AMORPHOUS, HIGH GLASS TRANSITION TEMPERATURE COPOLYESTER COMPOSITIONS, METHODS OF MANUFACTURE, AND ARTICLES THEREOF

(75) Inventors: Navinchandra S. Asthana, Evansville, IN (US); Ganesh Kannan, Evansville, IN (US)

(73) Assignee: Saudi Basic Industries Corporation, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 13/397,189

(22) Filed: Feb. 15, 2012

(65) Prior Publication Data

US 2013/0206635 A1    Aug. 15, 2013

(51) Int. Cl.
*C08G 63/02* (2006.01)
*C08F 8/00* (2006.01)

(52) U.S. Cl.
USPC ........... 528/298; 528/279; 528/302; 528/307; 524/605; 525/174

(58) Field of Classification Search
CPC ......... C08L 67/02; C08L 51/04; C08L 55/02; C08K 5/00; C08K 5/13; C08K 5/5333; C07C 51/09; C07C 63/26; C07C 2101/16; C07C 2102/42; C07C 39/17; C07C 39/23; C08G 63/185; C08G 18/345; C08G 18/794
USPC .................................. 528/298, 302, 307, 279
See application file for complete search history.

(56) References Cited

U.S. PATENT DOCUMENTS

| | | |
|---|---|---|
| 2,012,267 A | 8/1935 | Carothers |
| 2,780,609 A | 2/1957 | Petropoulos |
| 2,830,966 A | 4/1958 | Petropoulos |
| 2,873,262 A | 2/1959 | Petropoulos |
| 3,102,135 A | 8/1963 | Petropoulos et al. |
| 3,522,215 A | 7/1970 | Sardessai et al. |
| 3,535,286 A | 10/1970 | Stow et al. |
| 3,547,888 A | 12/1970 | Sardessai et al. |
| 3,634,089 A | 1/1972 | Hamb |
| 3,769,264 A | 10/1973 | Wilson et al. |
| 3,833,685 A | 9/1974 | Wambach |
| 3,856,752 A | 12/1974 | Bateman et al. |
| 3,951,886 A | 4/1976 | Miyake et al. |
| 3,953,539 A | 4/1976 | Kawase et al. |
| 3,989,664 A | 11/1976 | Kawase et al. |
| 4,128,526 A | 12/1978 | Borman |
| 4,178,277 A | 12/1979 | Gebauer et al. |
| 4,328,059 A | 5/1982 | Horlbeck et al. |
| 4,401,804 A | 8/1983 | Wooten et al. |
| 4,452,933 A | 6/1984 | McCready |
| 4,482,700 A | 11/1984 | Kuhnrich et al. |
| 4,500,575 A | 2/1985 | Taira et al. |
| 4,617,373 A | 10/1986 | Pruett et al. |
| 4,659,615 A | 4/1987 | Ishii et al. |
| 5,266,601 A | 11/1993 | Kyber et al. |
| 5,268,420 A | 12/1993 | Nishimura et al. |
| 5,271,985 A | 12/1993 | Tsunashima et al. |
| 5,378,796 A | 1/1995 | George et al. |
| 5,391,263 A | 2/1995 | Hepner et al. |
| 5,391,362 A | 2/1995 | Reinalda et al. |
| 5,413,681 A | 5/1995 | Tustin et al. |
| 5,446,079 A | 8/1995 | Buchanan et al. |
| 5,451,611 A | 9/1995 | Chilukuri et al. |

(Continued)

FOREIGN PATENT DOCUMENTS

| | | |
|---|---|---|
| DE | 19638488 A1 | 3/1998 |
| EP | 0103531 B1 | 3/1984 |

(Continued)

OTHER PUBLICATIONS

U.S. Appl. No. 13/032,051, filed Feb. 22, 2011.
U.S. Appl. No. 13/032,091, filed Feb. 22, 2011.
U.S. Appl. No. 13/032,121, filed Feb. 22, 2011.
U.S. Appl. No. 13/183,786, filed Jul. 15, 2011.
U.S. Appl. No. 13/183,807, filed Jul. 15, 2011.
U.S. Appl. No. 13/183,821, filed Jul. 15, 2011.
U.S. Appl. No. 13/221,159, filed Aug. 30, 2011.
U.S. Appl. No. 13/397,200, filed Feb. 15, 2012.
U.S. Appl. No. 13/397,210, filed Feb. 15, 2012.
JP59138222A with English Abstract; Date of Publication Aug. 8, 1984; 7 pages.

(Continued)

*Primary Examiner* — Ling Choi
*Assistant Examiner* — Gennadiy Mesh
(74) *Attorney, Agent, or Firm* — Cantor Colburn LLP; Diderico van Eyl

(57) ABSTRACT

An amorphous copolyester comprising the reaction product of (a) a monomer of formula I wherein $R^1$, $R^2$, $R^3$, and $R^5$ are each independently a $C_{1-3}$ alkyl group, a is 0-1, b is 0-4, c is 0-4 and d is 0-3, and each $R^4$ is independently hydrogen or a $C_{1-3}$ alkyl group; (b) a terephthalyl component selected from terephthalic acid, a di($C_{1-3}$ alkyl) terephthalate, and combinations thereof, derived from a terephthalyl-containing polyester; and (c) 1,4-cyclohexane dimethanol; wherein the monomer (a) units are present in an amount from 7 to less than 12 mole % of the copolyester based on the total moles of repeat units in the copolyester; and the copolyester has a glass transition temperature of at least 107° C., an intrinsic viscosity of at least 0.7 dl/g, and a molded sample has a Notched Izod value of at least 290 J/m determined in accordance with ASTM D256.

21 Claims, No Drawings

(56) References Cited

U.S. PATENT DOCUMENTS

| | | |
|---|---|---|
| 5,453,479 A | 9/1995 | Borman et al. |
| 5,466,777 A | 11/1995 | Caruso et al. |
| 5,498,749 A | 3/1996 | Heise et al. |
| 5,554,657 A | 9/1996 | Brownscombe et al. |
| 5,559,159 A | 9/1996 | Sublett et al. |
| 5,744,503 A | 4/1998 | Smith et al. |
| 5,817,721 A | 10/1998 | Warzelhan et al. |
| 5,844,023 A | 12/1998 | Tomka |
| 5,866,710 A | 2/1999 | Ridland et al. |
| 5,869,543 A | 2/1999 | Boos et al. |
| 6,020,393 A | 2/2000 | Khemani |
| 6,066,714 A | 5/2000 | Putzig et al. |
| 6,096,809 A | 8/2000 | Lorcks et al. |
| 6,120,895 A | 9/2000 | Kowitz et al. |
| 6,166,170 A | 12/2000 | Putzig |
| 6,201,034 B1 | 3/2001 | Warzelhan et al. |
| 6,231,970 B1 | 5/2001 | Andersen et al. |
| 6,235,815 B1 | 5/2001 | Loercks et al. |
| 6,303,738 B1 | 10/2001 | Putzig et al. |
| 6,383,729 B1 | 5/2002 | Ohnuma et al. |
| 6,384,129 B1 | 5/2002 | Lowry |
| 6,472,497 B2 | 10/2002 | Loercks et al. |
| 6,472,557 B1 | 10/2002 | Pell, Jr. et al. |
| 6,518,322 B1 | 2/2003 | West |
| 6,521,717 B1 | 2/2003 | Itoh |
| 6,649,731 B2 | 11/2003 | Hori et al. |
| 6,706,843 B1 | 3/2004 | Ishihara et al. |
| 6,713,595 B2 | 3/2004 | Chung et al. |
| 6,803,389 B2 | 10/2004 | Kawamura et al. |
| 6,998,462 B2 | 2/2006 | Duan et al. |
| 7,129,301 B2 | 10/2006 | Wu et al. |
| 7,160,977 B2 | 1/2007 | Hale et al. |
| 7,166,690 B2 | 1/2007 | Kim |
| 7,214,414 B2 | 5/2007 | Khemani et al. |
| 7,241,832 B2 | 7/2007 | Khemani et al. |
| 7,241,838 B2 | 7/2007 | Shelby et al. |
| 7,354,653 B2 | 4/2008 | Germroth et al. |
| 7,368,503 B2 | 5/2008 | Hale |
| 7,368,511 B2 | 5/2008 | Hale et al. |
| 7,737,246 B2 | 6/2010 | Crawford |
| 7,910,645 B2 | 3/2011 | Ahmed et al. |
| 8,088,834 B2 | 1/2012 | Agarwal et al. |
| 2001/0014388 A1 | 8/2001 | Bastioli et al. |
| 2002/0111409 A1 | 8/2002 | Talibuddin |
| 2004/0092672 A1 | 5/2004 | Bastioli et al. |
| 2004/0254330 A1 | 12/2004 | Duan et al. |
| 2005/0113534 A1 | 5/2005 | Agarwal et al. |
| 2005/0137304 A1 | 6/2005 | Strand et al. |
| 2006/0004151 A1 | 1/2006 | Shaikh et al. |
| 2006/0257676 A1 | 11/2006 | Itada et al. |
| 2007/0010648 A1 | 1/2007 | Partridge et al. |
| 2007/0066794 A1 | 3/2007 | Jernigan |
| 2007/0079945 A1 | 4/2007 | Noda et al. |
| 2007/0082573 A1 | 4/2007 | Noda et al. |
| 2007/0082981 A1 | 4/2007 | Noda et al. |
| 2007/0093634 A1 | 4/2007 | Salsman et al. |
| 2007/0208160 A1 | 9/2007 | Agarwal et al. |
| 2007/0244242 A1 | 10/2007 | Agarwal et al. |
| 2007/0264460 A1 | 11/2007 | Del Tredici |
| 2007/0275242 A1 | 11/2007 | Gopal et al. |
| 2007/0276069 A1 | 11/2007 | Agarwal et al. |
| 2008/0039571 A1 | 2/2008 | Cohoon et al. |
| 2008/0161449 A1 | 7/2008 | Yamamoto et al. |
| 2008/0274320 A1 | 11/2008 | Yokoyama et al. |
| 2008/0311385 A1 | 12/2008 | Miyazaki et al. |
| 2009/0169772 A1 | 7/2009 | Yamada et al. |
| 2009/0274885 A1 | 11/2009 | Egawa |
| 2009/0275698 A1 | 11/2009 | Ravi et al. |
| 2010/0041831 A1 | 2/2010 | Chung et al. |
| 2010/0168317 A1 | 7/2010 | Cahoon-Brister |
| 2010/0168336 A1 | 7/2010 | Cohoon-Brister |
| 2010/0168371 A1 | 7/2010 | Berti et al. |
| 2011/0003964 A1 | 1/2011 | Agarwal et al. |
| 2011/0071235 A1 | 3/2011 | Kannan et al. |
| 2011/0120346 A1 | 5/2011 | Reisacher et al. |
| 2011/0178265 A1 | 7/2011 | Tanaka et al. |
| 2012/0232191 A1 | 9/2012 | Auggermann et al. |
| 2013/0030116 A1 | 1/2013 | Okaniwa et al. |

FOREIGN PATENT DOCUMENTS

| | | |
|---|---|---|
| EP | 0272417 A2 | 6/1988 |
| EP | 0573680 | * 12/1993 |
| EP | 0331746 B1 | 6/1994 |
| EP | 0634435 A1 | 1/1995 |
| EP | 0736557 A1 | 10/1996 |
| EP | 0575349 B2 | 8/2003 |
| EP | 1344765 A1 | 9/2003 |
| EP | 1426404 A1 | 6/2004 |
| EP | 1437377 A1 | 7/2004 |
| EP | 1473324 A1 | 11/2004 |
| EP | 1627893 A1 | 2/2006 |
| EP | 0950678 A1 | 12/2006 |
| EP | 1862507 A1 | 12/2007 |
| EP | 2003159 A1 | 12/2008 |
| EP | 2042548 A1 | 4/2009 |
| EP | 1947145 A2 | 12/2009 |
| GB | 1507358 | 4/1978 |
| GB | 2101617 A | 1/1983 |
| WO | 9527753 | 10/1995 |
| WO | 0185824 A2 | 11/2001 |
| WO | 2005017034 A1 | 2/2005 |
| WO | 2007076384 A2 | 7/2007 |
| WO | 2007089598 A1 | 8/2007 |
| WO | 2007089600 A1 | 8/2007 |
| WO | 2008042384 A1 | 4/2008 |
| WO | 2008085396 A1 | 7/2008 |
| WO | 2009127556 A1 | 10/2009 |
| WO | 2010034711 A1 | 4/2010 |
| WO | 2010077809 A1 | 7/2010 |
| WO | 2011054786 A1 | 5/2011 |
| WO | 2013012706 A1 | 1/2013 |
| WO | 2013012707 A1 | 1/2013 |

OTHER PUBLICATIONS

JP60147430 Abstract; 1 page; Aug. 3, 1985.
JP9087370A with English Abstract; Date of Publication Mar. 31, 1997; 6 pages.
Machine Translation of JP2004098321; Apr. 2004; 6 pages.
Kleeberg et al.; "Biodegradation of Aliphatic-Aromatic copolyesters by Thermomonospora fusca and Other Thermophilic Compost Isolates"; Applied and Environmental Microbiology; vol. 64, No. 5; 1998, American Society for Microbiology; pp. 1731-1735.
International Search Report for International Patent Application No. PCT/US2012/068913; International Filing Date Dec. 11, 2012; Date of Mailing Mar. 25, 2013; 5 pages.
International Search Report of International Patent Application No. PCT/US2012/068907; International Date of Filing Dec. 11, 2012; Date of Mailing Mar. 25, 2013; 5 pages.
Written Opinion of the International Search Report for International Patent Application No. PCT/US2012/068907; International Date of Filing Dec. 11, 2012; Date of Mailing Mar. 25, 2013; 8 pages.
International Search Report of International Patent Application No. PCT/US2012/068909; International Filing Date Dec. 11, 2012; Date of Mailing Mar. 21, 2013; 5 pages.
Written Opinion of the International Search Report for International Patent Application No. PCT/US2012/068909; International Filing Date Dec. 11, 2012; Date of Mailing Mar. 21, 2013; 7 pages.
Written Opinion of the International Search Report for International Patent Application PCT/US2012/068913; International Date of Filing Dec. 11, 2012; Date of Mailing Mar. 25, 2013; 8 pages.
DE 19638488 A1 English Abstract; Date of Publication Mar. 26, 1998 2 pages.
JP19840003496 English Abstract; Date of Publication Aug. 3, 1985; 2 pages.
International Search Report for International Application No. PCT/US2012/071902; International Filing Date: Dec. 28, 2012; Date of Mailing Jun. 24, 2013; 5 pages.
Written Opinion of the International Search Report for International Application No. PCT/US2012/071902; International Filing Date: Dec. 28, 2012; Date of Mailing Jun. 24, 2013; 7 pages.

(56) References Cited

OTHER PUBLICATIONS

International Search Report for International Application No. PCT/US2012/071904; International Filing Date Dec. 28, 2012; Date of Mailing Jun. 24, 2013; 5 pages.
Written Opinion of the International Search Report for International Application No. PCT/US2012/071904; International Filing Date Dec. 28, 2012; Date of Mailing Jun. 24, 2013; 6 pages.
International Search Report for International Application No. PCT/US2012/071908; International Date of Filing Dec. 28, 2012; Date of Mailing May 7, 2013; 5 pages.
Written Opinion of the International Search Report for International Application No. PCT/US2012/071908; International Date of Filing Dec. 28, 2012; Date of Mailing May 7, 2013; 8 pages.
WO 2009127556 A1 English Abstract; Date of Publication Oct. 22, 2009; 2 pages.
WO 2011054786 A1 English Abstract; Date of Publication May 12, 2011; 1 page.
U.S. Appl. No. 13/409,898, filed Mar. 1, 2012.
U.S. Appl. No. 13/409,983, filed Mar. 1, 2012.
U.S. Appl. No. 13/432,638, filed Mar. 29, 2012.
U.S. Appl. No. 13/433,390, filed Mar. 29, 2012.
U.S. Appl. No. 13/435,865, filed Mar. 30, 2012.
Chang et al.; "Copolyesters. VII. Thermal Transitions of Poly(butylene terephthalate-co-isophthalate-co-adipate)s"; vol. 51; Issue 6; Feb. 1994; pp. 999-1004.
English Abstract of EP0007445 a1; Date of Publication Feb. 6, 1980; 1 page.
English Abstract of EP0519367 A1; Date of Publication Dec. 23, 1992; 2 pages.
English Abstract of EP2258545 A1; Date of Publication Dec. 8, 2010; 2 pages.
English Abstract of JP2000109665 A; Date of Publication Apr. 18, 2000; 1 page.
English Abstract of JP2003220645 A; Date of Publication Aug. 5, 2003; 1 page.
English Abstract of JP2004050769 A; Date of Publication Feb. 19, 2004; 1 page.
English Abstract of JP2004098321 A; Date of Publication Apr. 2, 2004; 2 pages.
English Abstract of JP2004204038 A; Date of Publication; 1 page.
English Abstract of JP2005052479 A; Date of Publication Mar. 3, 2005; 2 pages.
English Abstract JP2005220278 A; Aug. 18, 2005; 1 page.
English Abstract JP2008045117 A; Date of Publication Feb. 28, 2008; 2 pages.
English Abstract of JP3776578 B2; Date of Publication May 17, 2006; 1 page.
International Search Report for International Application No. PCT. JP2009/064418; International Date of Publication Nov. 10, 2009; Date of Mailing Nov. 17, 2009; 2 pages.
International Search Report for International Application No. PCT/US2012/026046; Date Mailed May 18, 2012; 5 pages.
Written Opinion of the International Search Report for International Application No. PCT/US2012/026046; Date of Mailing May 18, 2012; 8 pages.
International Search Report for International Application No. PCT/US2012/026048; Date Mailed May 18, 2012; 5 pages.
Written Opinion for International Application No. PCT/US2012/026048; Date Mailed May 18, 2012; 8 pages.
International Search Report for International Application No. PCT/US2012/026051; International Filing date Feb. 22, 2012; Date of Mailing Aug. 3, 2012; 5 pages.
Written Opinion of the International Search Report for PCT/US2012/026051; International Filing Date Feb. 22, 2012; Date of Mailing Aug. 3, 2012; 9 pages.
Ukielski et al.; "Effect of Chemical Modification of Poly(butylene terephthalate) on elastic properties"; International Polymer Science and Technology, vol. 31, No. 3; Jan. 2004; 6 pages.
Witt et al.; "New Biodegradable Polyester-Copolymers from Commodity Chemicals with Favorable Use Properties"; Journal of Environmental Polymer Degradation; vol. 3; No. 4; no month, 1995; pp. 215-223.
International Search Report for International Application No. PCT/US2012/046625; International Filing Date Jul. 13, 2012; Date of Mailing Dec. 12, 2012; 4 pages.
Written Opinion of the International Search Report for International Application No. PCT/US2012/046625; International Filing Date Jul. 13, 2012; Date of Mailing Dec. 20, 2012; 6 pages.
International Search Report for International Application No. PCT/US2012/046627; International Filing Date Jul. 13, 2012; Date of Mailing Dec. 12, 2012.
Written Opinion of the International Search Report for International Application No. PCT/US2012/046627; International Filing Date Jul. 13, 2012; Date of Mailing Dec. 12, 2012.
International Search Report for International Application No. PCT/US2012/046629; International Filing Date Jul. 13, 2012; Date of Mailing Dec. 20, 2012; 4 pages.
Written Opinion of the International Search Report for International Application No. PCT/US2012/046629; International Filing Date Jul. 13, 2012; Date of Mailing Dec. 20, 2012; 6 pages.
International Search Report for International Patent Application No. PCT/US2012/052971; International Filing Date Aug. 30, 2012; Date of Mailing Dec. 10, 2012; 5 pages.
Written Opinion of the International Search Report for International Patent Application No. PCT/US2012/052971; International Filing Date Aug. 30, 2012; Date of Mailing Dec. 10, 2012; 7 pages.
Scheirs et al.; "Modern Polyesters: Chemistry and Technology of Polyesters and Copolyesters"; 2003; pp. 293-321.

* cited by examiner

US 8,889,820 B2

AMORPHOUS, HIGH GLASS TRANSITION TEMPERATURE COPOLYESTER COMPOSITIONS, METHODS OF MANUFACTURE, AND ARTICLES THEREOF

BACKGROUND

This disclosure relates to amorphous, high glass transition copolyester compositions, methods of manufacture, and articles thereof.

Thermoplastic polyesters are readily molded into useful articles, and articles comprising polyesters have valuable characteristics including strength, toughness, high gloss, and solvent resistance. Polyesters therefore have utility in a wide range of applications, including automotive parts, electric appliances, and electronic devices.

Although polyesters can have a range of desirable performance properties, most of the commercially available amorphous polyesters, such as polyethylene terephthalate (PET), glycol-modified polyethylene terephthalate (PETG), and glycol-modified polycyclohexylenedimethylene terephthalate (PCTG), have useful impact properties, but low glass transition temperatures. This can significantly limit the range of applications for the polyesters. There accordingly remains a need in the marketplace for a new class of amorphous polyesters with better heat performance than those currently available.

BRIEF SUMMARY OF THE INVENTION

An amorphous copolyester is disclosed, comprising the reaction product of
(a) a monomer of formula I

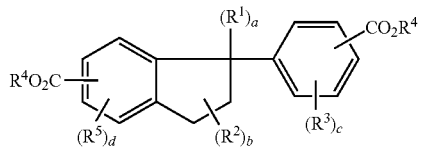

wherein, $R^1$, $R^2$, $R^3$, and $R^5$ are each independently a $C_{1-3}$ alkyl group, a is 0-1, b is 0-4, c is 0-4 and d is 0-3, and each $R^4$ is independently a hydrogen or a $C_{1-3}$ alkyl group;
(b) a terephthalyl component selected from terephthalic acid, a di($C_{1-3}$ alkyl) terephthalate, and combinations thereof, derived from a terephthalyl-containing polyester; and
(c) 1,4-cyclohexane dimethanol;
wherein
the monomer (a) units are present in an amount from 7 to less than 12 mole % of the copolyester based on the total moles of repeat units in the copolyester; and
the copolyester has
a glass transition temperature of at least 107° C.,
an intrinsic viscosity of at least 0.7 dl/g, and
a molded sample has a Notched Izod value of at least 290 J/m determined in accordance with ASTM D256 at 25° C.

In another embodiment, a method for the manufacture of the above copolyester comprises polymerizing the components in the presence of an esterification catalyst.

Compositions comprising the above amorphous polyester are also disclosed.

Further disclosed are articles comprising the copolyester and copolyester composition. Methods of manufacturing an article comprise extruding, shaping, calendaring, molding, or injection molding the copolyester composition.

The above described and other features are exemplified by the following detailed description.

DETAILED DESCRIPTION OF THE INVENTION

Our invention is based on the discovery that it is now possible to make an amorphous copolyester composition having a combination of high glass transition temperature, high strength, and good flow. These properties are achieved using a specific combination of monomer units, including a combination of 1-phenylindane dicarboxylic acid and a terephthalyl component, together with 1,4-cyclohexanedimethanol. In a particularly advantageous feature, the terephthalyl component is derived from recycle polyesters, including post-consumer waste and scrap polyester. In particular, the copolyester is manufactured from a dialkyl terephtalate that is derived from a terephthalic acid-based polyester homopolymer or copolymer. It has been discovered that careful selection and regulation of certain amounts and/or types of impurities in the residual composition allows the manufacture of copolyester from scrap or recycle polyesters that has properties comparable to the copolyesters derived from virgin monomers.

As used herein, the terms "recycle" or "scrap" are not intended to limit the source of the terephthalic acid-based polyester, as any terephthalic acid-based polyester can be used regardless of its source.

The prefix "bio-", "bio-based" or "bio-derived" as used herein means that the compound or composition is ultimately derived, in whole or in part, from a biological source, e.g., "bio-based terephthalic acid" is derived from a biological (e.g., plant or microbial source) rather than a petroleum source. Similarly, the prefix "petroleum-" or "petroleum-derived" means that the compound or composition is ultimately derived in whole from a petroleum source, e.g., a "petroleum-derived poly(ethylene terephthalate) is derived from reactants that are themselves derived from petroleum. U.S. patent application Ser. No. 12/347,423, filed Dec. 31, 2008 and published as US2010/0168371A1 on Jul. 1, 2010, describes bio-based polyesters produced from a biomass containing a terpene or terpenoid, such as limonene, as well as the process of making these products. The bio-based polyesters include poly(alkylene terephthalate)s such as bio-based poly(ethylene terephthalate) (bio-PET), bio-based poly(trimethylene terephthalate) (bio-PTT), bio-based poly(butylene terephthalate), bio-based poly(cyclohexylene terephthalate) (bio-PCT), bio-based poly(cyclohexylene terephthalate glycol) (bio-PCTG), bio-based (polyethylene terephthalate glycol) (bio-PETG).

As used herein the singular forms "a," "an," and "the" include plural referents. "Or" means "and/or." The term "combination" is inclusive of blends, mixtures, alloys, reaction products, and the like. Unless defined otherwise, technical and scientific terms used herein have the same meaning as is commonly understood by one of skill. Compounds are described using standard nomenclature. The term "and a combination thereof" is inclusive of the named component and/or other components not specifically named that have essentially the same function.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to" an amount means that the named component is present in some amount that is greater than 0, and up to and including the higher named amount.

Polyesters are generally manufactured by polymerization of a dicarboxylic acid or reactive derivative thereof and a diol or reactive derivative thereof. The copolyesters herein are manufactured by polymerization of two dicarboxylic acids: (a) a 1-phenylindane dicarboxylic acid or a reactive derivative thereof; and (b) a terephthalic acid or reactive derivative thereof, derived from a terephthalate-containing homopolymer, a terephthalate-containing copolymer, or a combination thereof. The diol is 1,4-cyclohexanedimethanol or a reactive derivative thereof.

The 1-phenylindane dicarboxylic acid monomer is a monomer of formula I

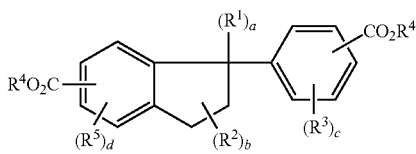

wherein $R^1$, $R^2$, $R^3$, and $R^5$ are each independently a $C_{1-3}$ alkyl group, a is 0-1, b is 0-4, c is 0-4 and d is 0-3, and each $R^4$ is independently a hydrogen or a $C_{1-3}$ alkyl group. The acid or the corresponding $C_{1-3}$ alkyl ester can be used.

One skilled in the art will recognize this general class of monomers as the dicarboxylic acid derivatives of phenyl indane. Among these dicarboxylic acids are: 3-(4-carboxyphenyl)-1,1,3-trimethyl-5-indan carboxylic acid; 3-(4-carboxyphenyl)-1,3-diethyl-1-methyl-5-indan carboxylic acid; 3-(4-carboxyphenyl)-1,3-dipropyl-1-methyl-5-indan carboxylic acid, and the like.

In a specific embodiment the monomers are of formula II

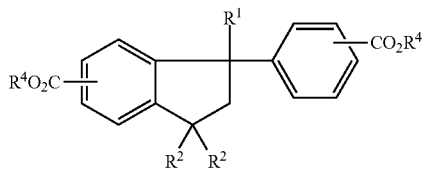

wherein each $R^4$ is independently hydrogen or a $C_{1-3}$ alkyl group. Monomers of formula III can be specifically mentioned,

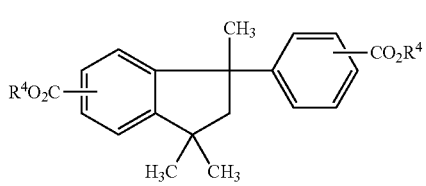

wherein each $R^4$ is independently hydrogen or a $C_{1-3}$ alkyl group. In an embodiment, each $R^4$ is the same and is a methyl or ethyl group, specifically a methyl group. This monomer is known in the literature and is also known as 1,3,3-trimethyl-1-phenylindan-4',5-dicarboxylic acid; 1,1,3-trimethyl-5-carboxy-3-(p-carboxy-phenyl)indane; 1,1,3-trimethyl-5-carboxy-3-(4-carboxyphenyl)indan; and 3-(4-carboxyphenyl)-1,1,3-trimethyl-5-indan carboxylic acid. As described in U.S. Pat. No. 3,859,364, monomer III is a commercially available material, generally referred to as phenylindan dicarboxylic acid, or, abbreviated, PIDA. Means for the preparation of PIDA have been disclosed by Petropoulous in, for example, U.S. Pat. No. 2,780,609, No. 2,830,966, No. 2,873,262, and No. 3,102,135. Copolyesters of PIDA with terephthalic acid and ethylene glycol have been described in Belgian 731,258 and Netherlands 690,5547. Alternatively, the monomer I, II, or III is a bio-based material, i.e., derived wholly or in part from a biological material, which excludes organic material that has been transformed by geological processes into petroleum, petrochemicals, and combinations thereof.

The terephthalyl component (terephthalic acid, a di($C_{1-3}$ alkyl) terephthalate, or combinations thereof) is derived from a terephthalate-containing homopolymer, a terephthalate-containing copolymer, or a combination thereof. For example, the copolyester can be prepared using a terephthalic acid diester monomer derived from a terephthalic acid-containing polyester, wherein the polyester can be a homopolymer, a copolymer, or a combination thereof. For convenience such polyester homopolymers, copolymers, and combination can be collectively referred to herein as a poly(hydrocarbylene terephthalate). Poly(hydrocarbylene terephthalate)s may contain units derived from dicarboxylic acids in addition to the terephthalic acid, for example isophthalic acid, adipic acid, glutaric acid, azelaic acid, sebacic acid, fumaric acid, and the various isomers of cyclohexane dicarboxylic acid. The poly(hydrocarbylene terephthalate)s can be a poly(alkylene terephthalate), wherein the alkylene group comprises 2 to 18 carbon atoms. Examples of alkylene groups include ethylene, 1,2-butylene, 1,3-butylene, 1,4-butylene, trimethylene, pentylene, hexylene, cyclohexylene, 1,4-cyclohexylene, and 1,4-cyclohexanedimethylene. A combination comprising at least one of the foregoing alkylene groups can be present. Poly(arylene terephthalate)s can also be used, for example poly(naphthalene terephthalate)s based on naphthalene dicarboxylic acids, including the 2,6-, 1,4-, 1,5-, or 2,7-isomers but the 1,2-, 1,3-, 1,6-, 1,7-, 1,8-, 2,3-, 2,4-, 2,5-, and/or 2,8-isomers. The poly(hydrocarbylene terephthalate)s can also have a combination of alkylene and arylene groups. In a specific embodiment, the poly(hydrocarbylene terephthalate) is poly(ethylene terephthalate). As described above, other alkylene or arylene groups can be present, in addition to residues derived from other dicarboxylic acids.

In an embodiment, the terephthalyl-containing polyester is selected from poly(ethylene terephthalate), poly(butylene terephthalate), poly(1,3-propylene terephthalate), poly(1,2-propylene terephthalate), poly(cyclohexylene-1,4-dimethylene terephthalate), poly(cyclohexylene-1,4-dimethylene-co-ethylene terephthalate), and combinations thereof.

The terephthalyl-containing polyester may contain virgin monomers, recycle monomers, including petroleum-based monomers and bio-based monomers. Thus, the terephthalyl component can be bio-based, i.e., derived in whole or in part from a biological material, which excludes organic material that has been transformed by geological processes into petroleum, petrochemicals, and combinations thereof.

In a specific embodiment the terephthalyl component comprising the diester monomer derived from the poly(hydrocarbylene terephthalate) comprises a ($C_{1-3}$)alkyl ester of terephthalic acid, and in particular a dimethyl terephthalate (DMT)

or a diethyl terephthalate (DET). The DMT or DET can be made by any suitable process and generally further comprises a residual composition containing residues arising from the manufacture of the DMT or DET from the poly(hydrocarbylene terephthalate). The components of the residual composition differ depending on the poly(hydrocarbylene terephthalate) used and the process conditions. For example, the residual composition can comprise a residue selected from isophthalic acid, dimethyl isophthalate, diethyl isopthalate, cyclohexane dimethanol, 1,4-butane diol, 1,3-propanediol, diethylene glycol, triethylene glycol, and combinations thereof. In an embodiment, the terephthalyl component includes more than 0.1 to 10 weight percent (wt. %) of a residual composition selected from isophthalic acid, dimethyl isophthalate (DMI), diethyl isophthalate (DEI), cyclohexane dimethanol (CHDM), 1,4-butane diol, 1,3-propanediol, diethylene glycol (DEG), triethylene glycol, or a combinations thereof.

In an embodiment, the copolyester compositions can be made by a process that involves depolymerization of a polyester by, for example, treatment of bulk poly(ethylene terephthalate) with super-heated methanol or ethanol vapor in the presence of a suitable transesterification catalyst at atmospheric pressure. The resulting dimethyl or diethyl terephthalate includes a residual composition in an amount from more than 0.1 to 10 wt. % of a residual component selected from isophthalic acid, dimethyl isophthalate, diethyl isophthalate, cyclohexane dimethanol, diethylene glycol, triethylene glycol, or a combinations thereof.

In another embodiment, poly(alkylene terephthalate, particularly poly(ethylene terephthalate), can alternatively be treated with steam at a temperature from about 200° C. to about 450° C., where the steam-treated poly(ethylene terephthalate) is then reduced from a brittle solid product to a powder having a mean particles size of from about 0.0005 to 0.002 millimeters, after which the fine powder is atomized with a gaseous substance including inert gas and methanol or ethanol vapor to form an aerosol. The aerosol is conducted through a reaction zone at a temperature of 250° C. to 300° C. in the presence of excess methanol or ethanol vapors to produce DMT or DET. The residual composition includes from 0.1 to less than 10 wt. % of a residual component selected from isophthalic acid, dimethyl isophthalate, diethyl isophthalate, cyclohexane dimethanol, diethylene glycol, triethylene glycol, or a combinations thereof. Alternatively, poly (ethylene terephthalate) waste can be subdivided into dimensions between 4 and 35 mesh and treated at a temperature of 100° C. to 300° C. in the presence of methanol or ethanol and acid catalysts to produce DMT or DET. The residual composition includes from 0.1 to less than 10 wt. % of a residual component selected from isophthalic acid, dimethyl isophthalate, diethyl isophthalate, cyclohexane dimethanol, diethylene glycol, triethylene glycol, or a combination thereof. Scrap polyester can be dissolved in oligomers of ethylene glycol and terephthalate acid or dimethyl terephthalate, followed by passing super-heated methanol or ethanol through the solution, where the ethylene glycol and dimethyl terephthalate or diethyl terephthalate are subsequently recovered overhead.

In still another embodiment, the terephthalyl component can be made by processes that use methanol or ethanol vapor under pressurized conditions. Again, the residual composition includes 0.1 to 10 wt. % of a residual component selected from isophthalic acid, dimethyl isophthalate, diethyl isophthalate, cyclohexane dimethanol, diethylene glycol, triethylene glycol, or a combination thereof. The temperature at which the process is practiced can vary. In an embodiment, when a process that uses methanol under pressure is used in conjunction with a transesterification catalyst, the process is practiced at a temperature from 120-200° C., or higher than 200° C.

The monomers produced from these processes can be purified, for example by techniques such as distillation, crystallization, and filtration. However, the cost of the purification steps can render the recovered monomers more expensive than virgin raw materials. Surprisingly, it has been found by the inventors hereof that certain levels of impurities can be present in the $(C_{1-3})$alkyl terephthalic esters, in particular DMT or DET, used to produce copolyester, yielding copolyester that has properties comparable to copolyester produced from virgin monomers. Without being bound by theory, it is believed that at least a portion of the impurities are incorporated into the copolyester backbone, resulting in a copolymer with altered properties.

Thus, a $di(C_{1-3})$alkyl terephthalic ester derived from a terephthalic-containing polyester homopolymer, terephthalic-containing copolymer, or a combination thereof and containing from 0.1 to 10 wt. % of a residual component selected from isophthalic acid, dimethyl isophthalate, diethyl isopthalate, cyclohexane dimethanol, diethylene glycol, triethylene glycol, and combinations thereof can be successfully used in the manufacture of copolyester having commercially valuable properties. In an embodiment, the terephthalyl component comprises from 0.1 to 8, from 0.1 to 5, from 0.1 to 3 wt. %, from 0.1 to 1 wt. %, or from 0.1 to 0.5 wt. % of the residual composition, based on the total weight of the terephthalyl component, with the remainder being the $di(C_{1-3})$alkyl terephthalic ester. In addition to the monomers I, II, or III and the terephthalyl component, the copolyester is manufactured from 1,4-cyclohexane dimethanol. In an embodiment, the 1,4-cyclohexane dimethanol has an isomer distribution of 60 to 80% trans and 20 to 40% cis isomers. In a specific embodiment, the amorphous copolyester comprises reacted 1,4-cyclohexane dimethanol in an amount of 40 to 50 mole %, 45 to 50 mole %, or 50 mole %, based on the total moles of repeat units in the copolyester. The CHDM can be virgin monomer, derived from a polyester, or bio-based. For example, one skilled in the art will recognize that DMT or DET derived from a terephthalic-containing polyester homopolymer, terephthalic-containing copolymer, or a combination thereof can be further hydrogenated to 1,4-CHDM. In this instance, the resulting 1,4-CHDM will also contain 1,3-CHDM by-product generated by DMI hydrogenation. Accordingly, where 1,4-CHDM derived from recycle DMT or DET is used, the copolyester can further comprise units derived from 1,3-CHDM. For example, the copolyester can comprise from 0.01 to 5 mole %, from 0.01 to 1 mole %, or from 0.01 to 0.5 mole % of 1,3-cyclohexane dimethanol units, based on the total moles of repeat units in the copolyester.

Methods for the manufacture of the copolyesters from the terephthalyl component, and in particular DMT or DET residual compositions, PIDA, and 1,4-cyclohexane dimethanol are known and can be used. For example, the copolyesters can be obtained by melt-process condensation, or solution phase condensation in the presence of an acid catalyst. The catalyst facilitates the transesterification reaction, and can be selected from antimony compounds, tin compounds, titanium compounds, combinations thereof as well as many other metal catalysts and combinations of metal catalysts that have been disclosed in the literature. The amount of catalyst required to obtain an acceptable polymerization rate at the desired polymerization temperature will vary, and can be determined by experimentation. The catalyst amount can be 1 to 5000 ppm, or more. It is possible to prepare a branched polyester in which a branching agent, for example, a glycol having three or more hydroxyl groups or a trifunctional or multifunctional carboxylic acid has been incorporated. Furthermore, it is sometimes desirable to have various concentrations of acid and hydroxyl end groups on the polyester, depending on the ultimate end use of the composition.

In an advantageous feature, the copolyesters have an advantageous combination of properties, including an improved Tg, good intrinsic viscosity, and good impact strength.

The copolyesters manufactured from 1,4-cyclohexane dimethanol, PIDA and the terephthalyl component have a Tg of at least 107° C., specifically 107 to 110° C.

In general, the copolyester manufactured from 1,4-cyclohexane dimethanol, PIDA and the terephthalyl component have an intrinsic viscosity of at least 0.7 deciliters per gram (dL/g), as measured in a 60:40 by weight phenol/1,1,2,2-tetrachloroethane mixture at 23° C.

The copolyester further has good impact strength, in particular a molded sample has a Notched Izod value of at least 290 J/m, at least 400 J/m, or at least 600 J/m, determined in accordance with ASTM D256 at 25° C.

The copolyester can have a weight average molecular weight of 10,000 to 200,000 atomic mass units (amu), specifically 50,000 to 150,000 amu as measured by gel permeation chromatography (GPC) using polystyrene standards. The copolyester can also comprise a mixture of different batches of copolyester prepared under different process conditions in order to achieve different intrinsic viscosities and/or weight average molecular weights.

The copolyester can be clear or translucent. In an embodiment, the copolyesters are clear. For example, molded samples of the copolyester can have a haze of less than 20%, less than 15%, less than 10%, less than 5%, or less than 3%, and a transmission greater than 70%, greater than 80%, greater than 85%, or greater than 90%, each measured according to ASTM D 1003-07 using illuminant C at a 0.062 inch (1.5 mm) thickness.

The copolyesters can be used as a component in thermoplastic compositions for a variety of purposes. The copolyester can be present in the thermoplastic composition in an amount from 20 to 99.99 wt. %, or from 20 to 95 wt. %, or from 30 to 80 wt. %, based on the total weight of the composition. Within this range, at least 50 wt. %, specifically at least 70 wt. %, of the copolyester can be present. In an embodiment, the polyester is present in an amount from 50 to 99 wt. %, based on the total weight of the thermoplastic composition, specifically from 60 to 98 wt. %, more specifically from 70 to 95 wt. %, each amount based on the total weight of the thermoplastic composition. The remaining components of the thermoplastic compositions can be other additives, including other polymers as further described below.

Such thermoplastic composition can optionally comprise other polyesters and/or other polymers, for example other polyesters or polycarbonates. As used herein, "polyesters" is inclusive of homopolymers and copolymers comprising ester units, and "polycarbonate" is inclusive of homopolymers and copolymers comprising carbonate units. Exemplary polyesters include poly(ethylene terephthalate) ("PET"), poly(1,4-butylene terephthalate), ("PBT"), poly(ethylene naphthalate) ("PEN"), poly(butylene naphthalate), ("PBN"), poly(1,3-propylene terephthalate) ("PPT"), poly(cyclohexane-1,4-dimethylene terephthalate) ("PCT"), poly(cyclohexane-1,4-dimethylene cyclohexane-1,4-dicarboxylate) also known as poly(1,4-cyclohexane-dimethanol 1,4-dicarboxylate) ("PCCD"), and poly(cyclohexylene-1,4-dimethylene-co-ethylene terephthalate), also known as cyclohexanedimethanol-terephthalic acid-ethylene glycol ("PCTG" or "PETG") copolymers. When the molar proportion of cyclohexanedimethanol is higher than that of ethylene glycol the polyester is termed PCTG. When the molar proportion of ethylene glycol is higher than that of cyclohexane dimethanol the polyester is termed PETG. As is known in the art, the foregoing polyesters can further comprise units derived from isophthalic acid. Combinations of the foregoing polymers can be used. The other polymer can be present in an amount of from 0.01 to 80 wt. %, or from 5 to 80 wt. %, or from 30 to 70 wt. %, each based on the total weight of the copolyester and the other polymers in the thermoplastic polyester composition. For example, a thermoplastic polyester composition comprising copolyester manufactured from the combination of the monomer I, II, or III, the terephthalyl residue, and the CHDM, can comprise from 1 to 80 wt. % percent, or from 5 to 80 wt. %, or from 30 to 70 wt. %, based on the total weight of the polyesters and other polymers in the thermoplastic polyester composition, of a second polyester, for example poly(ethylene terephthalate), poly(ethylene naphthalate), poly(1,4-butylene naphthalate), poly(trimethylene terephthalate), poly(1,4-cyclohexanedimethylene 1,4-cyclohexanedicarboxylate), poly(1,4-cyclohexanedimethylene terephthalate), poly(1,4-butylene-co-1,4-but-2-ene diol terephthalate), poly(1,4-cyclohexanedimethylene-co-ethylene terephthalate), or a combination comprising at least one of the foregoing polyesters. Alternatively, the thermoplastic polyester composition can comprise 1 to 50 wt. %, or 1 to 30 wt. %, or 1 to 10 wt. %, based on the total weight of the polyester and other polymers in the composition of a polycarbonate and/or an aromatic copolyester carbonate. In a specific embodiment, the polymer component of the thermoplastic composition consists only of the copolyester. In another embodiment, the polymer component comprises at least 70 wt. % of the copolyester. In a specific embodiment the other polymer includes one or more impact modifiers. The thermoplastic copolyester composition can thus optionally comprise the amorphous copolyester and an impact modifier.

For example, the thermoplastic composition can optionally further comprise an impact modifier in an amount from 0.25 to 40 wt. %, or from 0.5 to 25 wt. %, or from 1 to 10 wt. %, based on the total weight of the composition. In other embodiments, the impact modifier is present in an amount from 0.5 to 8 wt. %, specifically from 1.0 to 6 wt. %, still more specifically 0 to 1.0 wt. %, based on the total weight of the composition. In another embodiment, the thermoplastic composition does not include an impact modifier or does not contain appreciable amounts of an impact modifier. In such embodiments, the impact modifier is present in an amount, based on wt. %, ranging from 0 to less than an integer selected from the group consisting of 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, 1 wt. %, and combinations thereof.

Useful impact modifiers include olefin-containing copolymers such as olefin acrylates and olefin diene terpolymers. An example of an olefin acrylate copolymer impact modifier is ethylene ethylacrylate copolymer available from Union Carbide as DPD-6169. Other higher olefin monomers can be employed as copolymers with alkyl acrylates, for example, propylene and n-butyl acrylate. Olefin diene terpolymers known in the art and generally fall into the EPDM (ethylene propylene diene monomer) family of terpolymers. They are commercially available such as, for example, EPSYN® 704 from Copolymer Rubber Company. Examples of such rubber polymers and copolymers that can be used as impact modifiers are polybutadiene, polyisoprene, and various other polymers or copolymers having a rubbery dienic monomer, for example random copolymers of styrene and butadiene (SBR).

Other thermoplastic impact modifiers are unit copolymers, for example, A-B diblock copolymers and A-B-A triblock copolymers having one or two alkenyl aromatic units A, which are typically styrene units, and a rubber unit, B, which is typically an isoprene or butadiene unit. The butadiene unit may be partially hydrogenated. Mixtures of these diblock and triblock copolymers are especially useful. Examples of A-B and A-B-A copolymers include polystyrene-polybutadiene, polystyrene-poly(ethylene-propylene), polystyrene-polyisoprene, poly($\alpha$-methylstyrene)-polybutadiene, polystyrene-polybutadiene-polystyrene (SBS), polystyrene-poly(ethylene-propylene)-polystyrene, polystyrene-polyisoprene-polystyrene and poly(alpha-methylstyrene)-polybutadiene-poly(alpha-methylstyrene), as well as the selectively hydrogenated versions thereof, and the like. Mixtures of the aforementioned unit copolymers are also useful. Styrene-containing polymers can also be used as impact modifiers.

Other copolymers containing vinyl aromatic compounds, for example styrene, para-methyl styrene, or alpha methyl styrene and vinyl cyanides, for example acrylonitrile or methacrylonitrile, may also be useful as impact modifiers. One example is styrene-acrylonitrile (SAN), comprising 15 to 30 percent by weight acrylonitrile (AN) with the remainder styrene. The SAN may be further modified by grafting to a rubbery substrate such as a 1,4-polybutadiene to produce a rubber graft polymer, e.g., acrylonitrile-butadiene-styrene (ABS), and methacrylonitrile-butadiene-styrene (MBS). High rubber content (greater than about 50 wt. %) resins of this type (e.g., HRG-ABS) may be especially useful These types of polymers are often available as core-shell polymers. The core usually consists substantially of an acrylate rubber or a butadiene rubber, wherein one or more shells have been grafted on the core. Usually these shells are built up from a vinyl aromatic compound, a vinyl cyanide, an alkyl acrylate or methacrylate, acrylic acid, methacrylic acid, or a combination of the foregoing. The core and/or the shell(s) often comprise multi-functional compounds that may act as a cross-linking agent and/or as a grafting agent. These polymers are usually prepared in several stages. Still other impact modifiers include various elastomeric materials such as organic silicone rubbers, elastomeric fluorohydrocarbons, elastomeric polyesters, random unit polysiloxane-polycarbonate copolymers, and the like.

Specific examples of useful impact modifiers include acrylonitrile-butadiene-styrene, methacrylate-butadiene-styrene, high impact polystyrene, and combinations thereof.

With the proviso that desired properties, such as high heat properties, mold shrinkage, tensile elongation, heat deflection temperature, and the like are not adversely affected, the thermoplastic compositions comprising the copolyester can optionally further comprise other known additives used in thermoplastic polyester compositions such as reinforcing fillers, non-reinforcing fillers, stabilizers such as antioxidants, thermal stabilizers, radiation stabilizers, and ultraviolet light absorbing additives, as well as mold release agents, plasticizers, quenchers, lubricants, antistatic agents, dyes, pigments, laser marking additives, and processing aids. A combination comprising one or more of the foregoing or other additives can be used. A specific example of an additive combination is a hindered phenol stabilizer and a waxy mold release agent such as pentaerythritol tetrastearate. When used, the additives are generally present in an amount of 0.01 to 5 wt. %, specifically 0.05 to 2 wt. % each. Alternatively, such additives may be absent from the composition. In one embodiment, such additives are present in an amount ranging from 0 to a number selected from the group consisting of 5, 4, 3, 2, 1, wt. %.

The thermoplastic copolyester compositions can be prepared by blending the components of the composition so that they are homogeneously dispersed in a continuous matrix of the polyester. A number of blending processes can be used. In an exemplary process, the copolyester, other optional polymers, and/or other additives are mixed in an extrusion compounder and extruded to produce molding pellets. In another process, the components, including any reinforcing fibers and/or other additives, are mixed with the copolyester by dry blending, fluxed on a mill and either comminuted or extruded and chopped. The components can also be mixed and directly molded, e.g. by injection or transfer molding. All of the components are dried as much as possible prior to blending. In addition, compounding is carried out with as short a residence time in the machine as possible and at the lowest possible temperature to minimize loss of components by decomposition or volatilization. The temperature is carefully controlled, and friction heat is utilized.

Methods of manufacture of articles include molding, extruding, shaping, injection molding, or calendaring the amorphous copolyester, in particular thermoplastic compositions comprising the amorphous copolyester. In one embodiment, the components are pre-compounded, pelletized, and then molded. Pre-compounding can be carried out in known equipment. For example, after pre-drying the polyester composition (e.g., for four hours at 120° C.), a single screw extruder can be fed with a dry blend of the ingredients, the screw employed having a long transition section to ensure proper melting. Alternatively, a twin-screw extruder with intermeshing co-rotating screws can be fed with polyester and other components at the feed port and reinforcing fibers (and other additives) can optionally be fed downstream. In either case, a generally suitable melt temperature will be 230° C. to 300° C. The pre-compounded components can be extruded and cut up into molding compounds such as granules, pellets, and the like by standard techniques. The granules or pellets can then be molded in any known equipment used for molding thermoplastic compositions, such as a Newbury or van Dorn type injection-molding machine with cylinder temperatures at 230° C. to 280° C., and mold temperatures at 55° C. to 95° C. The granules and pellets can also be extruded into films or sheets. The articles formed by molding or extrusion of the thermoplastic polyester compositions possess an excellent balance of properties.

In particular, the thermoplastic copolyester composition can be molded into useful articles such as heat resistant containers by a variety of means for example, injection molding, blow molding, extruding, and the like. The thermoplastic copolyester composition can also be used to form at least parts in articles such as a wire, an optical fiber, a cable, an automotive part, an outdoor product, a biomedical intermediate or product, a composite material, a melt-spun mono- or multi-filament fiber, an oriented or un-oriented fiber, a hollow, porous or dense component; a woven or non-woven fabric (e.g., a cloth or a felt), a filter, a membrane, a sheet, a film (thin and thick, dense and porous), a multi-layer- and/or multicomponent film, a barrier film, a container, a bag, a bottle, a rod, a liner, a vessel, a pipe, a pump, a valve, an O-ring, an expansion joint, a gasket, a heat exchanger, an injection-molded article, a see-through article, a sealable packaging, a profile, heat-shrinkable film, a thermoplastically welded part, a generally simple and complex part, such as rods, tubes, profiles, linings and internal components for vessels, tanks, columns, pipes, fittings, pumps and valves; an O-ring, a seal, a gasket, a heat exchanger, a hose, an expansion joint, a shrinkable tube; a coating, such as protective coatings, electrostatic coatings, cable and wire coatings, optical fiber coatings; and the like.

In a specific embodiment, the preferred embodiment, a thermoplastic composition comprising the copolyester, or comprising the copolyester and an impact modifier, are formed into a container such as a bottle, having a wall thickness from 1.0 mm 10.0 mm, and an internal volume ranging from 1 to 10,000 mL, from 10 to 5,000 mL, or from 250 to 5,000 mL.

In another specific embodiment, a thermoplastic composition comprises an amorphous copolyester comprising the polymerization reaction product of: (a) a monomer of formula III

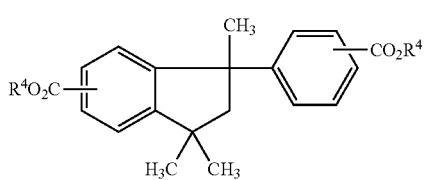

wherein $R^4$ is each the same and is methyl or ethyl; (b) a terephthalyl component selected from dimethyl or diethyl terephthalate, and combinations thereof, derived from a terephthalyl-containing polyester, wherein the terephthalyl component further comprises a residual composition, wherein the residual composition comprises from 0.1 to 10 wt. % of a residue selected from isophthalic acid, diethyl isopthalate, dimethyl isophthalate, cyclohexane dimethanol, 1,4-butane diol, 1,3-propanediol, diethylene glycol, triethylene glycol, and combinations thereof, and (c) 1,4-cyclohexane dimethanol having an isomer distribution of 60 to 80% trans and 20 to 40% cis isomers; wherein the residue of monomer (a) is present in an amount from 7 to less than 12 mole % of and the residue of monomer (b) is present in an amount from more than 38 to 43 mol %, each based on moles of repeat units in the polyester; and the copolyester has a glass transition temperature of at least 107° C., an intrinsic viscosity of at least 0.7 dl/g, and a molded sample has a Notched Izod value of at least 290 J/m determined in accordance with ASTM D256. This thermoplastic composition can further comprise an additive is selected from reinforcing fillers, non-reinforcing fillers, antioxidants, thermal stabilizers, radiation stabilizers, ultraviolet light absorbing additives, mold release agents, plasticizers, quenchers, lubricants, antistatic agents, dyes, pigments, laser marking additives, processing aids, and combinations thereof, and optionally a polymer selected from polycarbonate, poly(ethylene terephthalate), poly(butylene terephthalate), poly(butylene naphthalate), poly(1,2-propylene terephthalate), poly(cyclohexylene-1,4-dimethylene terephthalate), poly(ethylene terephthalate), poly(1,3-propylene terephthalate), poly(cyclohexylene-1,4-dimethylene cyclohexylene-1,4-dicarboxylate), poly(cyclohexylene-1,4-dimethylene-co-ethylene terephthalate), poly(cyclohexylene-1,4-dimethylene-co-1,3-cyclobutylene terephthalate), and combinations thereof.

Articles that can be made from our compositions include and not limited food containers and medical devices, which may be FDA approved. Other articles include housewares articles such as utensils, water bottles, beer bottles, juice containers, soft drink containers, and combinations thereof. Medical articles can include hemodiafilteration housings, medical devices housings for Gamma radiation, e-beam and ethylene oxide sterilization devices. Infant care articles include baby bottles, pacifier housings, baby food makers, and combinations thereof. Consumer durable articles include and are not limited to chair mats. Small appliance articles can include blending jars, juicemaker jars, frozen beverage dispensers, food maker jars, coffee cups, hot drink cups and containers, and sports drink bottles. In another specific embodiment, this thermoplastic composition, optionally comprising an impact modifier, are formed into a container such as a bottle, having a wall thickness from 1.0 mm 10.0 mm, and an internal volume from 1 to 10,000 mL, from 10 to 5,000 mL, or from 250 to 5,000 mL.

EXAMPLES

Materials

The Examples were performed according to the procedures below using the materials identified in Table 1.

TABLE 1

| Material | Description | Source |
|---|---|---|
| DET | Diethyl terephthalate | — |
| DMT | Dimethyl terepthalate | — |
| PIDA* | 1,3,3-trimethyl-1-phenylindane-4',6'-dicarboxylic acid | Amoco |
| CHDM | 1,4-cyclohexane dimethanol, 30/70 cis/trans ratio | Eastman Chemical Company |
| TPT | Titanium tetraisopropoxide (TYZOR catalyst) | DuPont Chemical |

*Used as received

The DET and DMT were synthesized on a laboratory scale from post-consumer waste PET. The DET and DMT accordingly contained residual ethylene glycol (EG) and diethyl isopthalate (DEI) or dimethyl isopthalate (DMI).

Techniques and Procedures
Molding Procedures

The polymers obtained in the Examples were injection molded on a BOY molding machine. The pellets were dried for 3 hour at 82° C. in a forced air-circulating oven prior to injection molding. The zone temperature was set to 260° C. The nozzle temperature was also set at 260° C. The mold temperature was 54° C. The screw speed was 100 revolutions per minute (rpm). The injection, holding, cooling and cycle time were 1.5, 6, 18 and 32 seconds, respectively. All standard parts were 0.125 inches (3.12 mm) thick.

Testing Procedures

Injection molded parts as described above were tested in accordance with the ASTM and ISO procedures.

Glass transition temperature (Tg) was determined according to ASTM D3418. by Differential Scanning calorimetry (DSC) using Perkin Elmer DSC 7 equipped with Pyris DSC 7 software. In a typical procedure, polymer sample (10-20 mg) was heated from 40° C. to 290° C. (20° C./min), held at 290° C. for 1 min, cooled back to 40° C. (20° C./min), then held at 40° C. for 1 min, and the above heating/cooling cycle was repeated. The second heating cycle is usually used to obtain the Tg data.

Intrinsic viscosity (IV) was determined by automatic Viscotek Microlab® 500 series Relative Viscometer Y501. In a typical procedure, 0.5000 g of polymer sample was fully dissolved in 60/40 mixture (by vol) of % phenol/1,1,2,2-tetrachloroethane solution (Harrell Industries). Two measurements were taken for each sample, and the result reported was the average of the two measurements.

Weight average molecular weight (Mw) and number average molecular weight (Mn) were determined by GPC. A Waters 2695 separation module equipped with a single PL HFIP gel (250×4.6 mm) and a Waters 2487 Dual λ Absorbance Detector (signals observed at 273 nm) was used for GPC analysis. The mobile phase was a mixture of 5/95% HFIP/Chloroform solution. Typically, samples were prepared by dissolving 50 mg of the polymer pellets in 50 mL of 5/95% HFIP/Chloroform solution. The results were processed using Millennium 32 Chromatography Manager V 4.0. Reported molecular weights are relative to polystyrene standards.

Notched Izod testing is done on 3×½×⅛ inch (76.2×12.7×3.2 mm) bars using ASTM method D256 at 25° C. Bars were notched prior to oven aging; samples were tested at room temperature.

Examples 1-7

A variety of co-polyesters from DMT (Example 1) and DET (Examples 2-7) obtained from post-consumer PET were synthesized on laboratory scale as shown in Table 2. These polyesters were all made with 250 ppm of titanium (TPT) as the catalyst. The CHDM used was a mixture of 30% cis and 70% trans configuration.

TABLE 2

| Ex. No. | DET Mol % | PIDA Mol % | EG Mol % | DMI Mol % | (DET + DMI + PIDA):(CHDM + EG) Ratio | EI Temp ° C. | EI Time Min | Poly Temp ° C. | Poly Time Min |
|---|---|---|---|---|---|---|---|---|---|
| 1* | 43 | 7 | 0 | 0 | 1 | 220 | 90 | 270 | 60 |
| 2 | 41 | 7 | 0 | 2 | 1 | 220 | 90 | 270 | 60 |
| 3 | 42.5 | 7 | 0 | 0.5 | 1 | 220 | 90 | 270 | 60 |
| 4 | 41.5 | 7 | 0 | 1.5 | 1 | 220 | 90 | 270 | 60 |
| 5 | 42.3 | 7 | 0.8 | 0.7 | 1 | 220 | 90 | 270 | 60 |
| 6 | 42.5 | 7 | 1 | 0.5 | 1 | 220 | 90 | 270 | 60 |
| 7 | 41.5 | 7 | 0 | 1.5 | 1 | 220 | 90 | 270 | 60 |

(*DMT was used as a source of terephthalate in this experiment)

Example 1

A mixture of 83.42 g (0.43 mol) of DMT, 22.68 g (0.07 mol) of PIDA and 72 g (0.5 mol) of as obtained CHDM were placed into a 500 mL, three neck round bottom flask equipped with a nitrogen inlet, glass stirrer with a metal blade, and a short distillation column. The flask was placed in an oil bath already heated to 180° C. with the stirring speed set at 260 rpm. After 5 minutes, 250 ppm of titanium catalyst was added to the reaction mixture, and the temperature was gradually increased to 220° C. at a rate of 2° C./minute while stirring under nitrogen. The reaction mixture was heated at 220° C. for 23 minutes and then the temperature of reaction was increased to 270° C. After the reaction temperature reached 270° C., pressure inside the reactor was gradually reduced to 0.2 mm Hg (less than 1 torr) over the next 47 minutes. A pressure of less than 1 torr was maintained for a total time of 60 minutes. During this period, the stirring speed was reduced to 60 rpm, was maintained for 20 min was subsequently reduced to 30 rpm for the remainder of polymerization stage. The reaction was stopped and product was collected for analysis.

The results for this example are shown in the table below.

| Example No | $T_g$ (° C.) | $M_n$ | $M_w$ | PDI | I.V. | Notched Izod (J/m) |
|---|---|---|---|---|---|---|
| 1 | 112 | 34460 | 99453 | 2.9 | 0.90 | 1130 |

Discussion

Our results indicate that when our polymer having a repeat unit comprising the reaction product of (a) PIDA, (b) dialkyl terephthalate and (c) cyclohexane dimethanol and the PIDA is present in an amount ranging from 7 to less 12 mol %, based on the repeat unit of polymer, the polymer exhibited a combination of the following useful properties: (i) the polymer had Tg of at least 107° C.; and (ii) the polymer had a Notched Izod of at least 290 Joules/m, and (iii) the polymer had an intrinsic viscosity IV of at least 0.7 dl/g (iv) polymer had ethylene glycol residues ranging between 0 and 5 mol %.

Example 2

A mixture of 91.02 g (0.41 mol) of DET, 3.88 g (0.02 mol) of DMI, 22.68 g (0.07 mol) of PIDA, and 73.44 g (0.51 mol) of as obtained CHDM were placed into a 500 mL, three neck round bottom flask equipped with a nitrogen inlet, glass stirrer with a metal blade, and a short distillation column. The flask was placed in an oil bath already heated to 180° C. with the stirring speed set at 260 rpm. After 5 minutes, 250 ppm of titanium catalyst was added to the reaction mixture, and the temperature was gradually increased to 220° C. at a rate of 2° C./minute while stirring under nitrogen. The reaction mixture was heated at 220° C. for 23 minutes and then the temperature of reaction was increased to 270° C. After the reaction temperature reached 270° C., pressure inside the reactor was gradually reduced to 0.2 mm Hg (less than 1 torr) over the next 47 minutes. A pressure of less than 1 torr was maintained for a total time of 60 minutes. During this period, the stirring speed was reduced to 60 rpm, was maintained for 20 min was subsequently reduced to 30 rpm for the remainder of polymerization stage. The reaction was stopped and product was collected for analysis.

The results for this example are shown in the table below.

| Example No | $T_g$ (° C.) | $M_n$ | $M_w$ | PDI | I.V. | Notched Izod (J/m) |
|---|---|---|---|---|---|---|
| 2 | 109.3 | 31046 | 92832 | 3 | 0.82 | 519 |

Discussion

Our results indicate that when our polymer having a repeat unit comprising the reaction product of (a) PIDA, (b) dialkyl terephthalate, and (c) cyclohexane dimethanol and the PIDA is present in an amount ranging from 7 to less 12 mol %, based on the repeat unit of polymer, the polymer exhibited a combination of the following useful properties: (i) the polymer had Tg of at least 107° C.; and (ii) the polymer had a Notched Izod of at least 290 Joules/m, and (iii) the polymer had an intrinsic viscosity IV of at least 0.7 dl/g and (iv) polymer had ethylene glycol and isophthalate residues ranging between 0 and 5 mol %.

Example 3

A mixture of 94.35 g (0.425 mol) of DET, 0.97 g (0.005 mol) of DMI, 22.68 g (0.07 mol) of PIDA and 73.44 g (0.51 mol) of as obtained CHDM were placed into a 500 mL, three neck round bottom flask equipped with a nitrogen inlet, glass stirrer with a metal blade, and a short distillation column. The flask was placed in an oil bath already heated to 180° C. with the stirring speed set at 260 rpm. After 5 minutes, 250 ppm of titanium catalyst was added to the reaction mixture, and the temperature was gradually increased to 220° C. at a rate of 2° C./minute while stirring under nitrogen. The reaction mixture was heated at 220° C. for 23 minutes and then the temperature of reaction was increased to 270° C. After the reaction temperature reached 270° C., pressure inside the reactor was gradually reduced to 0.2 mm Hg (less than 1 torr) over the next 47 minutes. A pressure of less than 1 torr was maintained for a total time of 60 minutes. During this period, the stirring speed was reduced to 60 rpm, was maintained for 20 min was subsequently reduced to 30 rpm for the remainder of polymerization stage. The reaction was stopped and product was collected for analysis.

The results for this example are shown in the table below.

| Example No | $T_g$ (° C.) | $M_n$ | $M_w$ | PDI | I.V. | Notched Izod (J/m) |
|---|---|---|---|---|---|---|
| 3 | 109.3 | 26384 | 73687 | 2.8 | 0.74 | 352 |

Discussion

Our results indicate that when our polymer having a repeat unit comprising the reaction product of (a) PIDA, (b) dialkyl terephthalate, and (c) cyclohexane dimethanol and the PIDA is present in an amount ranging from 7 to less 12 mol %, based on the repeat unit of polymer, the polymer exhibited a combination of the following useful properties: (i) the polymer had Tg of at least 107° C.; and (ii) the polymer had a Notched Izod of at least 290 Joules/m, and (iii) the polymer had an intrinsic viscosity IV of at least 0.7 dl/g and (iv) polymer had ethylene glycol and isophthalate residues ranging between 0 and 5 mol %.

Example 4

A mixture of 92.15 g (0.415 mol) of DET, 2.91 g (0.015 mol) of DMI, 22.68 g (0.07 mol) of PIDA and 73.44 g (0.51 mol) of as obtained CHDM were placed into a 500 mL, three neck round bottom flask equipped with a nitrogen inlet, glass stirrer with a metal blade, and a short distillation column. The flask was placed in an oil bath already heated to 180° C. with the stirring speed set at 260 rpm. After 5 minutes, 250 ppm of titanium catalyst was added to the reaction mixture, and the temperature was gradually increased to 220° C. at a rate of 2° C./minute while stirring under nitrogen. The reaction mixture was heated at 220° C. for 23 minutes and then the temperature of reaction was increased to 270° C. After the reaction temperature reached 270° C., pressure inside the reactor was gradually reduced to 0.2 mm Hg (less than 1 torr) over the next 47 minutes. A pressure of less than 1 torr was maintained for a total time of 60 minutes. During this period, the stirring speed was reduced to 60 rpm, was maintained for 20 min was subsequently reduced to 30 rpm for the remainder of polymerization stage. The reaction was stopped and product was collected for analysis.

The results for this example are shown in the table below.

| Example No | $T_g$ (° C.) | $M_n$ | $M_w$ | PDI | I.V. | Notched Izod (J/m) |
|---|---|---|---|---|---|---|
| 4 | 109.6 | 30578 | 91412 | 3.0 | 0.85 | 324 |

Discussion

Our results indicate that when our polymer having a repeat unit comprising the reaction product of (a) PIDA, (b) dialkyl terephthalate, and (c) cyclohexane dimethanol and the PIDA is present in an amount ranging from 7 to less 12 mol %, based on the repeat unit of polymer, the polymer exhibited a combination of the following useful properties: (i) the polymer had Tg of at least 107° C.; and (ii) the polymer had a Notched Izod of at least 290 Joules/m, and (iii) the polymer had an intrinsic viscosity IV of at least 0.7 dl/g and (iv) polymer had ethylene glycol and isophthalate residues ranging between 0 and 5 mol %.

Example 5

A mixture of 93.90 g (0.423 mol) of DET, 1.38 g (0.007 mol) of DMI, 22.68 g (0.07 mol) of PIDA, 0.5 g (0.008 mol of EG) and 72.29 g (0.502 mol) of as obtained CHDM were placed into a 500 mL, three neck round bottom flask equipped with a nitrogen inlet, glass stirrer with a metal blade, and a short distillation column. The flask was placed in an oil bath already heated to 180° C. with the stirring speed set at 260 rpm. After 5 minutes, 250 ppm of titanium catalyst was added to the reaction mixture, and the temperature was gradually increased to 220° C. at a rate of 2° C./minute while stirring under nitrogen. The reaction mixture was heated at 220° C. for 23 minutes and then the temperature of reaction was increased to 270° C. After the reaction temperature reached 270° C., pressure inside the reactor was gradually reduced to 0.2 mm Hg (less than 1 torr) over the next 47 minutes. A pressure of less than 1 torr was maintained for a total time of 60 minutes. During this period, the stirring speed was reduced to 60 rpm, was maintained for 20 min was subsequently reduced to 30 rpm for the remainder of polymerization stage. The reaction was stopped and product was collected for analysis.

The results for this example are shown in the table below.

| Example No. | $T_g$ (° C.) | $M_n$ | $M_w$ | PDI | I.V. | Notched Izod (J/m) |
|---|---|---|---|---|---|---|
| 5 | 110 | 29520 | 82219 | 3.0 | 0.82 | 1190 |

Discussion

Our results indicate that when our polymer having a repeat unit comprising the reaction product of (a) PIDA, (b) dialkyl terephthalate, and (c) cyclohexane dimethanol and the PIDA is present in an amount ranging from 7 to less 12 mol %, based on the repeat unit of polymer, the polymer exhibited a combination of the following useful properties: (i) the polymer had Tg of at least 107° C.; and (ii) the polymer had a Notched Izod of at least 290 Joules/m, and (iii) the polymer had an intrinsic viscosity IV of at least 0.7 dl/g and (iv) polymer had ethylene glycol and isophthalate residues ranging between 0 and 5 mol %.

Example 6

A mixture of 94.35 g (0.425 mol) of DET, 0.97 g (0.005 mol) of DMI, 22.68 g (0.07 mol) of PIDA, 0.62 g (0.01 mol of EG) and 72 g (0.5 mol) of as obtained CHDM were placed into a 500 mL, three neck round bottom flask equipped with a nitrogen inlet, glass stirrer with a metal blade, and a short distillation column. The flask was placed in an oil bath already heated to 180° C. with the stirring speed set at 260 rpm. After 5 minutes, 250 ppm of titanium catalyst was added to the reaction mixture, and the temperature was gradually increased to 220° C. at a rate of 2° C./minute while stirring under nitrogen. The reaction mixture was heated at 220° C. for 23 minutes and then the temperature of reaction was increased to 270° C. After the reaction temperature reached 270° C., pressure inside the reactor was gradually reduced to 0.2 mm Hg (less than 1 torr) over the next 47 minutes. A pressure of less than 1 torr was maintained for a total time of 60 minutes. During this period, the stirring speed was reduced to 60 rpm, was maintained for 20 min was subsequently reduced to 30 rpm for the remainder of polymerization stage. The reaction was stopped and product was collected for analysis.

The results for this example are shown in the table below.

| Example No. | $T_g$ (° C.) | $M_n$ | $M_w$ | PDI | I.V. | Notched Izod (J/m) |
|---|---|---|---|---|---|---|
| 6 | 109 | 28071 | 83023 | 3.0 | 0.82 | 1130 |

Discussion

Our results indicate that when our polymer having a repeat unit comprising the reaction product of (a) PIDA, (b) dialkyl terephthalate, and (c) cyclohexane dimethanol and the PIDA is present in an amount ranging from 7 to less 12 mol %, based on the repeat unit of polymer, the polymer exhibited a combination of the following useful properties: (i) the polymer had Tg of at least 107° C.; and (ii) the polymer had a Notched Izod of at least 290 Joules/m, and (iii) the polymer had an intrinsic viscosity IV of at least 0.7 dl/g and (iv) polymer had ethylene glycol and isophthalate residues ranging between 0 and 5 mol %.

Example 7

A mixture of 92.15 g (0.415 mol) of DET, 2.91 g (0.015 mol) of DMI, 22.68 g (0.07 mol) of PIDA and 73.44 g (0.51 mol) of as obtained CHDM were placed into a 500 mL, three neck round bottom flask equipped with a nitrogen inlet, glass stirrer with a metal blade, and a short distillation column. The flask was placed in an oil bath already heated to 180° C. with the stirring speed set at 260 rpm. After 5 minutes, 250 ppm of titanium catalyst was added to the reaction mixture, and the temperature was gradually increased to 220° C. at a rate of 2° C./minute while stirring under nitrogen. The reaction mixture was heated at 220° C. for 23 minutes and then the temperature of reaction was increased to 270° C. After the reaction temperature reached 270° C., pressure inside the reactor was gradually reduced to 0.2 mm Hg (less than 1 torr) over the next 47 minutes. A pressure of less than 1 torr was maintained for a total time of 60 minutes. During this period, the stirring speed was reduced to 60 rpm, was maintained for 20 min was subsequently reduced to 30 rpm for the remainder of polymerization stage. The reaction was stopped and product was collected for analysis.

The results for this example are shown in the table below.

| Example No. | $T_g$ (° C.) | $M_n$ | $M_w$ | PDI | I.V. | Notched Izod (J/m) |
|---|---|---|---|---|---|---|
| 7 | 109 | 30467 | 89277 | 2.9 | 0.84 | 342 |

Discussion

Our results indicate that when our polymer having a repeat unit comprising the reaction product of (a) PIDA, (b) dialkyl terephthalate, and (c) cyclohexane dimethanol and the PIDA is present in an amount ranging from 7 to less 12 mol %, based on the repeat unit of polymer, the polymer exhibited a combination of the following useful properties: (i) the polymer had Tg of at least 107° C.; and (ii) the polymer had a Notched Izod of at least 290 Joules/m, and (iii) the polymer had an intrinsic viscosity IV of at least 0.7 dl/g and (iv) polymer had ethylene glycol and isophthalate residues ranging between 0 and 5 mol %.

Table 3 shows the results of compositional analysis of Examples 1-7 by proton nuclear magnetic resonance spectroscopy. Amounts of each unit represent mole %, based on the total moles of the units in the copolyester.

TABLE 3

Compositional Analysis by $^1$H NMR

| Ex. No. | Terephthalate | PIDA | CHDM (trans) | CHDM (cis) | Isophthalate | EG |
|---|---|---|---|---|---|---|
| 1 | 41.36 | 7.43 | 34.20 | 16.71 | 0 | 0.31 |
| 2 | 39.26 | 7.69 | 32.19 | 16.85 | 2.50 | 1.50 |
| 3 | 40.16 | 7.81 | 32.16 | 16.92 | 1.50 | 1.46 |
| 4 | 39.78 | 7.73 | 31.60 | 16.84 | 2.04 | 2.01 |
| 5 | 40.54 | 8.00 | 31.12 | 16.98 | 1.11 | 2.25 |
| 6 | 40.64 | 7.82 | 30.86 | 17.13 | 1.10 | 2.45 |
| 7 | 39.76 | 7.75 | 31.60 | 16.76 | 2.11 | 2.03 |

In addition, it was observed that the molded sample was clear and transparent.

All cited patents, patent applications, and other references are incorporated herein by reference in their entirety.

Although the present invention has been described in detail with reference to certain preferred versions thereof, other variations are possible. Therefore, the spirit and scope of the appended claims should not be limited to the description of the versions contained therein.

What is claimed is:

1. An amorphous copolyester comprising the polymerization reaction product of (a) a monomer of formula I

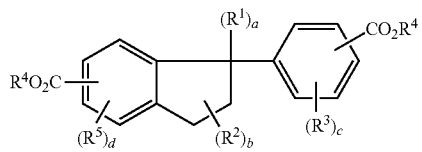

wherein $R^1$, $R^2$, $R^3$, and $R^5$ are each independently a $C_{1-3}$ alkyl group, a is 0-1, b is 0-4, c is 0-4 and d is 0-3, and each $R^4$ is independently hydrogen or a $C_{1-3}$ alkyl group;

(b) a terephthalyl component selected from terephthalic acid, a di($C_{1-3}$ alkyl) terephthalate, and combinations thereof, derived from a terephthalyl-containing polyester; and (c) 1,4-cyclohexane dimethanol;

wherein monomer units of monomer (a) are present in an amount from 7 to less than 12 mole % of the copolyester, monomer units of terephthalyl component (b) are present in an amount from more than 33 to 48 mol %, and monomer units of the 1,4-cyclohexane dimethanol (c) are present in an amount of 45 to 50 mole %, each based on the total moles of repeat units in the copolyester; and wherein the copolyester has a glass transition temperature of at least 107° C., an intrinsic viscosity of at least 0.7 dl/g, and a molded sample has a Notched Izod value of at least 290 J/m determined in accordance with ASTM D256.

2. The amorphous copolyester of claim 1, wherein the monomer of formula I is of formula II

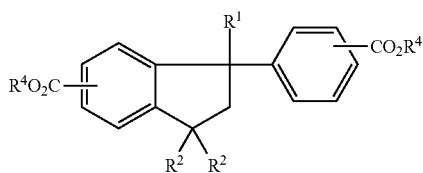

wherein each $R^4$ is independently hydrogen or a $C_{1-3}$ alkyl group.

3. The amorphous copolyester of claim 1 wherein the monomer of formula I is of formula III

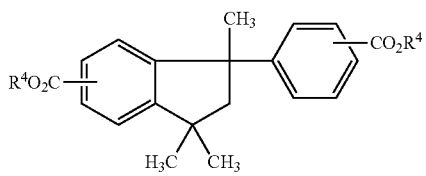

wherein each $R^4$ is independently hydrogen or a $C_{1-3}$ alkyl group.

4. The amorphous copolyester of claim 1, wherein the terephthalyl component comprises the di($C_{1-3}$ alkyl) terephthalate.

5. The amorphous copolyester of claim 1, wherein the terephthalyl component further comprises a residual composition, wherein the residual composition comprises a residue selected from isophthalic acid, diethyl isopthalate, dimethyl isophthalate, cyclohexane dimethanol, 1,4-butane diol, 1,3-propanediol, diethylene glycol, triethylene glycol, and combinations thereof.

6. The amorphous copolyester of claim 5, wherein the terephthalyl component comprises from 0.1 to 10 wt. % of the residual composition, based on the total weight of the terephthalyl component.

7. The amorphous copolyester of claim 1, wherein the terephthalyl-containing polyester is selected from poly(ethylene terephthalate), poly(butylene terephthalate), poly(1,3-propylene terephthalate), poly(1,2-propylene terephthalate), poly(cyclohexylene-1,4-dimethylene terephthalate), poly(cyclohexylene-1,4-dimethylene-co-ethylene terephthalate), and combinations thereof.

8. The amorphous copolyester of claim 7, wherein the terephthalyl-containing polyester is poly(ethylene terephthalate) derived from virgin monomers.

9. The amorphous copolyester of claim 7, wherein the terephthalyl-containing polyester is poly(ethylene terephthalate) derived from a recycle polyester.

10. The amorphous copolyester of claim 1 wherein the 1,4-cyclohexane dimethanol has an isomer distribution of 60 to 80% trans and 20 to 40% cis isomers.

11. The amorphous copolyester of claim 1, wherein the copolyester has a haze of less than 30% as determined in accordance with ASTM D 1003-7.

12. A composition comprising the amorphous copolyester of claim 1 and an additive selected from the group consisting of reinforcing fillers, non-reinforcing fillers, antioxidants, thermal stabilizers, radiation stabilizers, ultraviolet light absorbing additives, mold release agents, plasticizers, quenchers, lubricants, antistatic agents, dyes, pigments, laser marking additives, processing aids, and combinations thereof.

13. An article comprising the amorphous copolyester composition of claim 12.

14. The article of claim 13, wherein the article is in the form of a bottle.

15. The article of claim 14, wherein the bottle has a volume capacity from 250 milliliters to 5 liters.

16. A composition comprising the amorphous copolyester of claim 1 and an impact modifier.

17. The composition of claim 16, wherein the impact modifier is selected from acrylonitrile-butadiene-styrene, methacrylate-butadiene-styrene, high impact polystyrene, and combinations thereof.

18. An article comprising the amorphous copolyester composition of claim 16.

19. The article of claim 18, wherein the article is in the form of a bottle.

20. The article of claim 19, wherein the bottle has a volume capacity from 250 milliliters to 5 liters.

21. An amorphous copolyester comprising the polymerization reaction product of (a) a monomer of formula I

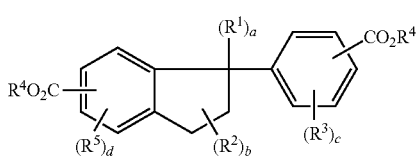

wherein $R^1$, $R^2$, $R^3$, and $R^5$ are each independently a $C_{1-3}$ alkyl group, a is 0-1, b is 0-4, c is 0-4 and d is 0-3, and each $R^4$ is independently hydrogen or a $C_{1-3}$ alkyl group;

(b) a terephthalyl component selected from terephthalic acid, a di($C_{1-3}$ alkyl) terephthalate, and combinations thereof, derived from a terephthalyl-containing polyester, wherein the terephthalyl-containing polyester is poly(ethylene terephthalate); and (c) 1,4-cyclohexane dimethanol;

wherein monomer units of monomer (a) are present in an amount from 7 to less than 12 mole % of the copolyester, monomer units of terephthalyl component (b) are present in an amount from more than 33 to 48 mol %, and monomer units of the 1,4-cyclohexane dimethanol (c) are present in an amount of 40 to 50 mole %, each based on the total moles of repeat units in the copolyester; and wherein the copolyester has a glass transition temperature of at least 107° C., an intrinsic viscosity of at least 0.7 dl/g, and a molded sample has a Notched Izod value of at least 290 J/m determined in accordance with ASTM D256.

* * * * *